US009124917B2

(12) United States Patent  
Ahn

(10) Patent No.: US 9,124,917 B2  
(45) Date of Patent: Sep. 1, 2015

(54) REMOTE CONTROLLER APPARATUS, BROADCAST RECEIVING APPARATUS AND METHOD FOR CONTROLLING THE SAME

(75) Inventor: Young-joon Ahn, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 13/615,011

(22) Filed: Sep. 13, 2012

(65) Prior Publication Data

US 2013/0070154 A1 Mar. 21, 2013

(30) Foreign Application Priority Data

Sep. 15, 2011 (KR) ........................ 10-2011-0093067

(51) Int. Cl.
*H04N 5/44* (2011.01)
*H04N 21/422* (2011.01)

(52) U.S. Cl.
CPC ..... *H04N 21/42204* (2013.01); *H04N 21/4221* (2013.01); *H04N 21/42226* (2013.01)

(58) Field of Classification Search
CPC .................................. H04N 5/44; H04N 5/50
USPC .......................................... 348/569, 734, 731
See application file for complete search history.

(56) References Cited

U.S. PATENT DOCUMENTS

| | | | |
|---|---|---|---|
| 4,757,459 A | 7/1988 | Lauchnor et al. | |
| 5,177,420 A | 1/1993 | Wada et al. | |
| 6,690,392 B1 * | 2/2004 | Wugoski ........................ 715/744 |
| 7,525,473 B2 | 4/2009 | Chu et al. | |
| 2001/0017615 A1 * | 8/2001 | Lin et al. ........................ 345/173 |
| 2005/0094610 A1 | 5/2005 | de Clerq et al. | |
| 2005/0097618 A1 | 5/2005 | Arling et al. | |
| 2005/0231414 A1 | 10/2005 | Chu et al. | |
| 2006/0044175 A1 | 3/2006 | Choi | |
| 2009/0210922 A1 | 8/2009 | White et al. | |

(Continued)

FOREIGN PATENT DOCUMENTS

| | | |
|---|---|---|
| CA | 2 329 693 A1 | 6/2002 |
| JP | 2006-14013 A | 1/2006 |

(Continued)

OTHER PUBLICATIONS

Communication, dated Mar. 7, 2013, issued by the European Patent Office in counterpart European Patent Application No. 12162621.2.

*Primary Examiner* — Jefferey Harold  
*Assistant Examiner* — Omer Khalid  
(74) *Attorney, Agent, or Firm* — Sughrue Mion, PLLC

(57) ABSTRACT

A remote controller apparatus for controlling a broadcast receiving apparatus is provided, in which the remote controller apparatus includes a storage unit, a user interface unit which sequentially receives at least one control instruction relating to controlling the broadcast receiving apparatus, an interface unit which transmits the at least one control instruction received via the user interface unit to the broadcast receiving apparatus, and which receives status information relating to the broadcast receiving apparatus based on the at least one control instruction, and a control unit causes the status information to be stored by the storage unit, and if the instruction relating to setting macro functionality is received via the user interface unit, generates a macro instruction relating to controlling the broadcast receiving apparatus based on the status information and causes the generated macro instruction to be stored by the storage unit.

24 Claims, 18 Drawing Sheets

(56) References Cited

U.S. PATENT DOCUMENTS

2009/0299541 A1    12/2009   Park et al.
2010/0097466 A1*   4/2010   Kondo et al. ................ 348/143
2010/0238062 A1    9/2010   Sunaga et al.

FOREIGN PATENT DOCUMENTS

| | | |
|---|---|---|
| JP | 2010-68259 A | 3/2010 |
| KR | 10-0647914 B1 | 11/2006 |
| KR | 10-1000923 B1 | 12/2010 |

* cited by examiner

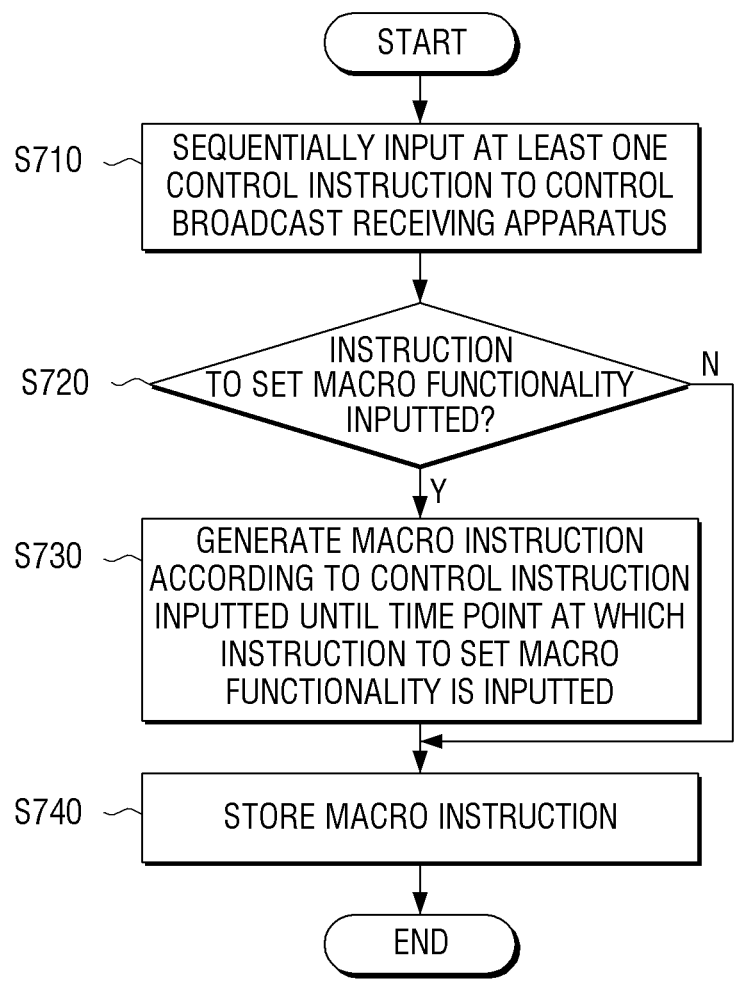

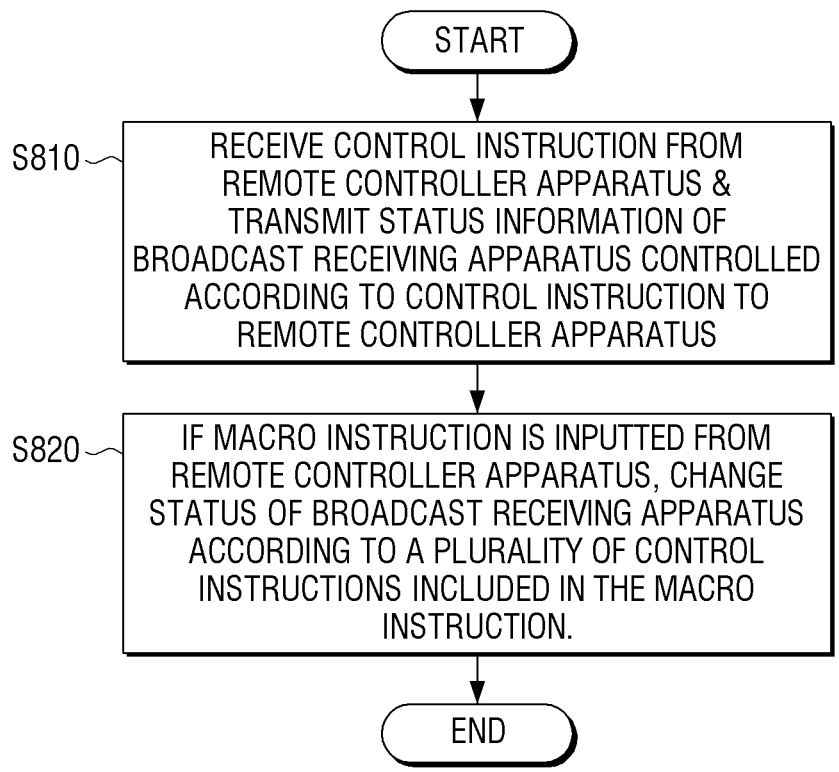

REMOTE CONTROLLER APPARATUS, BROADCAST RECEIVING APPARATUS AND METHOD FOR CONTROLLING THE SAME

CROSS-REFERENCE TO RELATED APPLICATIONS

This application claims priority from Korean Patent Application No. 10-2011-0093067, filed on Sep. 15, 2011, in the Korean Intellectual Property Office, the disclosure of which is incorporated herein by reference in its entirety.

BACKGROUND

1. Field

Apparatuses and methods consistent with the disclosure provided herein relate to remote controlling, broadcast receiving and controlling the same, and more particularly, to a remote controller apparatus, a broadcast receiving apparatus, and a control method for setting macro functionality on the remote controller apparatus to control the broadcast receiving apparatus.

2. Description of the Related Art

Recent advancements in electronic engineering have enhanced various functions relating to controlling a broadcast receiving apparatus by using a remote controller. In particular, a remote controller with a macro functionality set thereon can sequentially transmit pre-stored instructions to the broadcast receiving apparatus, thus enabling users to control certain operations of the broadcast receiving apparatus with ease.

Conventionally, the macro functionality is set on the remote controller generally as follows. A user sequentially inputs a macro registration start key and inputs remote controller keys intended as the macro instructions, and the remote controller stores infrared (IR) codes and time interval information relating to the remote controller keys inputted by the user. Then, as the user inputs macro registration end key, macro functionality is set.

As described above, the conventional macro functionality registration requires the user to input registration start key, which can be troublesome. Further, if the user inadvertently skips pressing the registration start key, the macro functionality is not set.

Further, because the macro functionality is executed simply based on the remote controller keys previously inputted by the user without considering the current status of the broadcast receiving apparatus, the broadcast receiving apparatus is sometimes controlled in a different way than the user intended.

Accordingly, there is a need for a method which can set macro functionality with increased efficiency while accounting for the current status of the broadcast receiving apparatus.

SUMMARY

Exemplary embodiments of the present inventive concept overcome the above disadvantages and other disadvantages not described above. Also, the present inventive concept is not required to overcome the disadvantages described above, and an exemplary embodiment of the present inventive concept may not overcome any of the problems described above.

According to one exemplary embodiment, a technical objective is to provide a remote controlling apparatus, a broadcast receiving apparatus, and a method for controlling the same, which generate macro instructions upon receipt of a macro functionality set command, in accordance with control instructions received thus far.

According to one exemplary embodiment, a technical objective is to provide a remote controlling apparatus, a broadcast receiving apparatus and a method for controlling the same, which receive status information relating to the broadcast receiving apparatus, and generate macro instructions to control the broadcast receiving apparatus in accordance with the status information.

In one exemplary embodiment, a remote controller apparatus for controlling a broadcast receiving apparatus may be provided, which may include a storage unit, a user interface unit which sequentially receives at least one control instruction relating to controlling the broadcast receiving apparatus, an interface unit which transmits the at least one control instruction received via the user interface unit to the broadcast receiving apparatus, and which receives status information relating to the broadcast receiving apparatus based on the at least one control instruction, a control unit which causes the status information to be stored by the storage unit, and if the instruction relating to setting macro functionality is received via the user interface unit, generates a macro instruction relating to controlling the broadcast receiving apparatus based on the status information and causes the generated macro instruction to be stored by the storage unit.

The status information may include at least one of: channel status, volume status, input source status, sound mode status, screen aspect ratio status and screen brightness status of the broadcast receiving apparatus.

The control unit may use recently-received status information to update prestored status information, and cause the updated status information to be stored by the storage unit.

If an instruction relating to searching the macro instructions stored by the storage unit is received, the control unit may control the user interface unit to cause the stored macro instruction that satisfies a preset condition included in the instructions relating to searching the macro instructions to be displayed.

If the instruction relating to setting macro functionality is received, the control unit may generate a macro instruction relating to controlling the broadcast receiving apparatus based on a status that corresponds to the status information, and automatically generate a macro title for the generated macro instruction based on a preset condition.

The control unit may generate a macro title corresponding to the status information based on Electronic Program Guide (EPG) information relating to the broadcast receiving apparatus.

The macro instruction may include at least one of: an instruction relating to tuning a channel and an instruction relating to adjusting a volume, and the control unit may transmit one of control instructions included in the macro instruction to the broadcast receiving apparatus and, if the broadcast receiving apparatus performs an operation based on the transmitted control instruction, transmit a next control instruction included in the macro instruction to the broadcast receiving apparatus.

The status information may include encoded information.

The storage unit may include a temporary storage area for temporarily storing the status information received via the interface unit, and an automatic storage area for providing redundant storage of the status information stored at the temporary storage area, and, if an instruction relating to setting macro functionality is not received within a preset standby time after reception of the status information, the control unit causes the status information stored at the temporary storage area to be stored at the automatic storage area and initializes the temporary storage area.

If there is status information stored at the automatic storage area that repeats at least a predetermined number of times, the control unit may controls the user interface unit to display a recommend screen to recommend that the repeating status information be set to macro functionality.

In one exemplary embodiment, a broadcast receiving apparatus is provided, which may include an interface unit which receives a control instruction from a remote controller apparatus and which transmits status information of the broadcast receiving apparatus to the remote controller apparatus, and a control unit which controls a status of the broadcast receiving apparatus based on the control instruction, wherein if a macro instruction is received from the remote controller apparatus, the control unit changes the status of the broadcast receiving apparatus based on a plurality of control instructions included in the macro instruction.

The status information may include at least one of: channel status, volume status, input source status, sound mode status, screen aspect ratio status and screen brightness status of the broadcast receiving apparatus.

In one exemplary embodiment, a control method for controlling a broadcast receiving apparatus by using a remote controller apparatus is provided, which may include sequentially receiving at least one control instruction relating to controlling the broadcast receiving apparatus, transmitting the at least one control instruction to the broadcast receiving apparatus, and receiving status information relating to the broadcast receiving apparatus based on the at least one control instruction, storing the status information, and if the instruction to set macro functionality is received, generating a macro instruction relating to controlling the broadcast receiving apparatus based on the status information, and storing the macro instruction.

The status information may include at least one of: channel status, volume status, input source status, sound mode status, screen aspect ratio status and screen brightness status of the broadcast receiving apparatus.

The control method may additionally include using recently-received status information to update prestored status information, and storing the updated status information.

If an instruction relating to searching the stored macro instructions is received, the control method may additionally include displaying the stored macro instruction that satisfies a preset condition included in the instruction relating to searching the stored macro instructions.

The generating the macro instruction may include, if the instruction relating to setting macro functionality is received, generating a macro instruction relating to controlling the broadcast receiving apparatus based on a status that corresponds to the status information, and automatically generating a macro title for the generated macro instruction according to a preset condition.

The generating the macro instruction may include generating a macro title corresponding to the status information based on Electronic Program Guide (EPG) information relating to the broadcast receiving apparatus.

The macro instruction may include at least one of: an instruction relating to tuning a channel and an instruction relating to adjusting a volume, and the control method may further include transmitting one of control instructions included in the macro instruction to the broadcast receiving apparatus, and, if the broadcast receiving apparatus performs an operation based on the control instruction, transmitting a next control instruction included in the macro instruction to the broadcast receiving apparatus.

The status information may include encoded information.

The storage unit may include a temporary storage area for temporarily storing the status information received via the interface unit, and an automatic storage area for providing redundant storage of the status information stored at the temporary storage area, and the control method may additionally include, if an instruction relating to setting macro functionality is not received within a preset standby time after reception of the status information, causing the status information stored at the temporary storage area to be stored at the automatic storage area and initializing the temporary storage area.

The control method may additionally include, if there is status information stored at to the automatic storage area that repeats at least a predetermined number of times, displaying a recommend screen to recommend that the repeating status information be set to macro functionality.

In one exemplary embodiment, a control method for controlling a broadcast receiving apparatus is provided, which may include receiving a control instruction from a remote controller apparatus and transmitting status information relating to the broadcast receiving apparatus to the remote controller apparatus, and if a macro instruction is received from the remote controller apparatus, changing a status of the broadcast receiving apparatus based on a plurality of control instructions included in the macro instruction.

The status information may include at least one of: channel status, volume status, input source status, sound mode status, screen aspect ratio status and screen brightness status of the broadcast receiving apparatus.

In various exemplary embodiments, because a user sets macro functionality once a control instruction is received without having to separately input macro registration start, users can set macro functionality with improved convenience. Further, because macro functionality is set based on the status information of the broadcast receiving apparatus, malfunction of the broadcast receiving apparatus is prevented.

BRIEF DESCRIPTION OF THE DRAWINGS

The above and/or other aspects of the present inventive concept will be more apparent by describing certain exemplary embodiments of the present inventive concept with reference to the accompanying drawings, in which:

FIG. 7 is a flowchart which illustrates a method for remote controlling a broadcast receiving apparatus according to an exemplary embodiment; and FIG. 8 is a flowchart which illustrates a control method used by a broadcast receiving apparatus according to an exemplary embodiment.

DETAILED DESCRIPTION OF EXEMPLARY EMBODIMENTS

Figure 1:
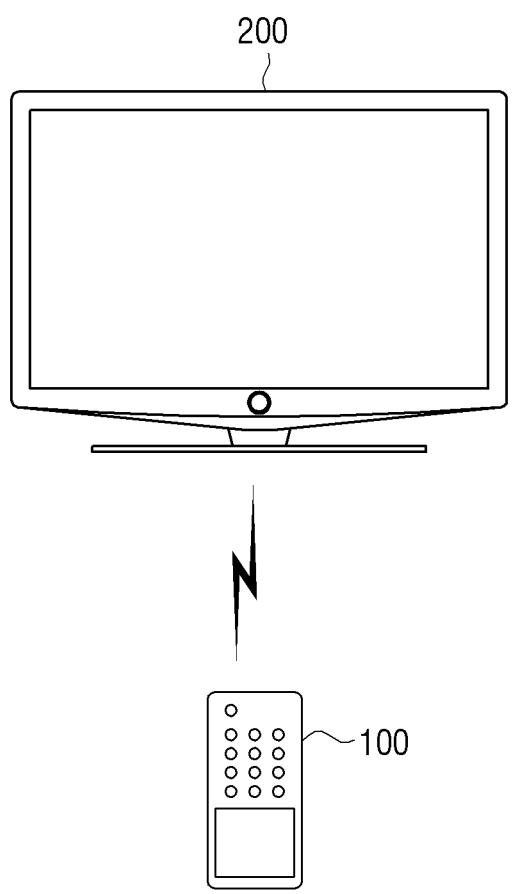
FIG. 1 illustrates a system which describes a setting of macro functionality according to an exemplary embodiment.

Certain exemplary embodiments of the present inventive concept will now be described in greater detail with reference to the accompanying drawings.

In the following description, same drawing reference numerals are used for the same elements even in different drawings. The matters defined in the description, such as detailed construction and elements, are provided to assist in a comprehensive understanding of the present inventive concept. Accordingly, it is apparent that the exemplary embodiments of the present inventive concept can be carried out without those specifically defined matters. In addition, well-known functions or constructions are not described in detail, because such would obscure the present disclosure with unnecessary detail.

FIG. 1 illustrates a system which describes a setting of macro functionality according to an exemplary embodiment. Referring to FIG. 1, the system includes a remote controller apparatus 100 and a broadcast receiving apparatus 200.

The broadcast receiving apparatus 200 sends out status information thereof to the remote controller apparatus 100, based on a control instruction received from the remote controller apparatus 100. The status information herein may include at least one of: channel status information, volume status information, input source status information, sound mode status information, screen aspect ratio status information, and screen brightness status information relating to the broadcast receiving apparatus 200.

In particular, channel status, volume status, sound mode status, screen aspect ratio status and screen brightness status may respectively refer to channel information, volume information, sound mode information (e.g., mono or stereo), screen aspect ratio information (e.g., 16:9 or 4:3), and brightness information.

The "input source status" herein may refer to information about a source from which the broadcast receiving apparatus receives at least one of video signal and audio signal. The input source may include S-Video, component, composite, D-Sub, DVI, or High Definition Multimedia Interface (HDMI) provided at the broadcast receiving apparatus.

The broadcast receiving apparatus 200 may change the status thereof based on a plurality of control instructions included in the macro instruction, if the macro instruction is received from the remote controller apparatus.

The "macro instruction" herein may include at least one of instructions generated based on the status information transmitted from the broadcast receiving apparatus, which may include, among other things, channel change, volume adjustment, input source change, sound mode change, screen aspect ratio change, and screen brightness change.

Accordingly, the macro instruction may control the broadcast receiving apparatus based on the channel, volume, input source, sound mode, screen aspect ratio and/or screen brightness received from the broadcast receiving apparatus.

The broadcast receiving apparatus 200 which is used to perform the above-described functions may include a digital television (TV), or the like. However, this is only one of many examples, and any device, such as a personal computer (PC), laptop computer, or portable media player (PMP) may also be implemented as the broadcast receiving apparatus 200, provided that the device receives a broadcast signal from outside, displays the same, and operates according to the user's instruction received from the remote controller apparatus 100.

The remote controller apparatus 100 may transmit at least one control instruction relating to controlling the broadcast receiving apparatus 200 to the broadcast receiving apparatus 200 and receive status information relating to the broadcast receiving apparatus in response.

Further, if an instruction relating to setting macro functionality is received from the user, the remote controller apparatus 100 may generate a macro instruction based on control instructions received until the time at which the instruction relating to setting macro functionality is received.

In particular, the remote controller apparatus 100 may generate a macro instruction by combining control instructions received for a preset amount of time in advance of the time at which the user inputs the instruction relating to setting macro functionality.

Further, the remote controller apparatus 100 may generate a macro instruction relating to controlling the broadcast receiving apparatus 200 based on the status information received from the broadcast receiving apparatus 200.

Further, the remote controller apparatus 100 may control at least one of channel, volume, input source, sound mode, screen aspect ratio and screen brightness by transmitting control instructions included in the macro instruction to the broadcast receiving apparatus 200.

In another exemplary embodiment, the remote controller apparatus 100 may set macro functionality without requiring user's separate initial instruction, and the macro functionality which is set may be optimized to the broadcast receiving apparatus 200. In particular, the remote controller apparatus may generate a macro by combining control instructions received for a preset amount of time before the time at which instruction relating to setting macro functionality is received, and based on the status of the broadcast receiving apparatus.

Figure 2A:
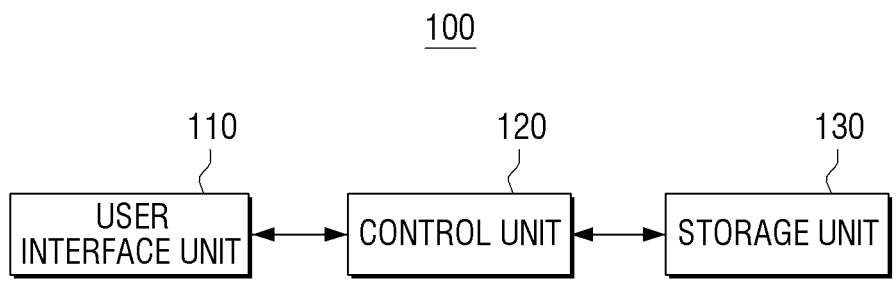
FIG. 2A is a block diagram which illustrates a construction of a remote controller apparatus according to an exemplary embodiment.

FIG. 2A is a block diagram which illustrates a construction of a remote controller apparatus according to an exemplary embodiment.

Referring to FIG. 2A, the remote controller apparatus 100 may include a user interface unit 110, a control unit 120, and a storage unit 130.

The user interface unit 110 may sequentially receive at least one control instruction relating to controlling the broadcast receiving apparatus.

In particular, the user interface unit 110 may include a plurality of function keys with which the user may set or select various functions supported by the broadcast receiving apparatus. The user interface unit 110 may be implemented, for example, in a form such as a keypad which is capable of enabling both input and output, or in a combined form such as a keypad combined with a display. More particularly, the user interface unit 110 may display a user interface (UI) window to help the user to set macro functionality via a touchpad or a display, and a search macro.

The storage unit 130 operates to store one or more macro instructions.

In particular, the storage unit 130 may include a temporary storage area for temporarily storing a control instruction received via the user interface unit 110, and an automatic storage area for providing redundant storage of the control instruction stored at the temporary storage area.

The storage unit 130 may be implemented as, for example, one or more of a volatile memory, a non-volatile memory such as a Flash memory, an Electrically Erasable and Programmable ROM (EEPROM), and a Hard Disk Drive (HDD).

The control unit 120 may control the respective components of the remote controller apparatus 100, and the control unit 120 may also control the overall operation of the remote controller apparatus 100.

In particular, if the instruction relating to setting macro functionality is received via the user interface unit 110, the control unit 120 may generate a macro instruction based on the one or more control instructions received thus far (i.e., received until the time at which an instruction relating to setting macro functionality is received).

More particularly, the control unit 120 may generate a macro instruction by combining the one or more control instructions received for a preset amount of time before the time at which the instruction relating to setting macro functionality is received. Accordingly, among the control instructions received via the user interface unit 110, it is possible to generate a macro instruction based on the control instructions that are received within a predetermined amount of time before the instruction relating to setting the macro functionality is received.

Further, if the instruction relating to setting the macro functionality is received after the preset amount of time and within a preset standby time, it is possible to generate a macro instruction by combining the one or more control instructions received within the standby time. The control unit 120 may cause the generated macro instruction to be stored by the storage unit 130, or initialize the temporary storage area by deleting the control instructions stored at the temporary storage area.

By way of example, if a sequence of control instructions such as "channel down", "volume up", "channel up", "channel up" is received within a predetermined amount of time via the user interface unit 110, the control unit 120 causes the received sequence of control instructions to be stored at the temporary storage area of the storage unit 130.

Further, if an instruction relating to setting macro functionality is received within a preset standby time after the receipt of the last control instruction, the control unit 120 may cause the storage unit 130 to store the sequence of control instructions such as, for example, "channel down", "volume up", "channel up", "channel up" which is received within a preset amount of time before the receipt of the instruction relating to setting macro functionality. Then, the control unit 120 may delete the control instructions such as "channel down", "volume up", "channel up", "channel up" from the storage unit 130, thereby initializing the temporary storage area.

As used herein, the "standby time" and "time unit" that includes a control instruction relating to generating a macro instruction may be set by the user.

Further, the control unit may generate a macro instruction by combining the one or more control instructions which is received within a preset amount of time from the receipt of the last control instruction, rather than combining the at least one control instruction that is received before the receipt of an instruction relating to setting macro functionality.

By way of example, since the receipt of the last control instruction (e.g., "channel up"), a macro instruction may be generated based on the control instructions received before the receipt of "channel up" for a preset amount of time (e.g., "volume up", "channel up", "channel up").

Further, if an instruction relating to setting macro functionality is not received within a preset standby time after elapse of the preset amount of time, the control unit 120 may cause the at least one control instruction stored at the temporary storage area to be stored at the automatic storage area and initialize the temporary storage area.

In particular, in the example described above, the control unit 120 may cause the control instruction sequence "channel down", "volume up", "channel up", "channel up" presently stored at the temporary storage area to be stored at the automatic storage area, and then delete the control instructions stored at the temporary storage area to thereby initialize the temporary storage area.

If the control instruction patterns stored at the automatic storage area include at least one control instruction pattern that repeats more than a preset number of times, the control unit 120 may control the user interface unit 110 to display a recommend screen to recommend setting the repeating control instruction pattern as a macro functionality.

By way of example, a sequence of control instructions such as "channel down", "volume up", "number button 1 (to set channel)", "number button 1 (to set channel)", "volume down", "channel up", "number button 1 (to set channel)", "number button 1 (to set channel)" may be stored at the automatic storage area.

In the above example, because the control instruction pattern of "number button 1 (to set channel)" combined with "number button 1 (to set channel)" repeats at least two times, the control unit 120 may display a user interface window on the user interface unit 110 to recommend setting "number button 1 (to set channel)", "number button 1 (to set channel)" as a macro functionality.

As used herein, the "preset number of times" may be set by the user.

In the example described above, a user interface window used for providing a recommendation relating to macro functionality is displayed on the user interface unit 110 of the remote controller apparatus 100, for illustrative example. However, other examples are possible. In particular, the remote controller apparatus 100 may send out a control instruction to the broadcast receiving apparatus 200 relating to displaying the user interface window in order to provide a recommendation relating to macro functionality through a display unit of the broadcast receiving apparatus 200.

Figure 2B:
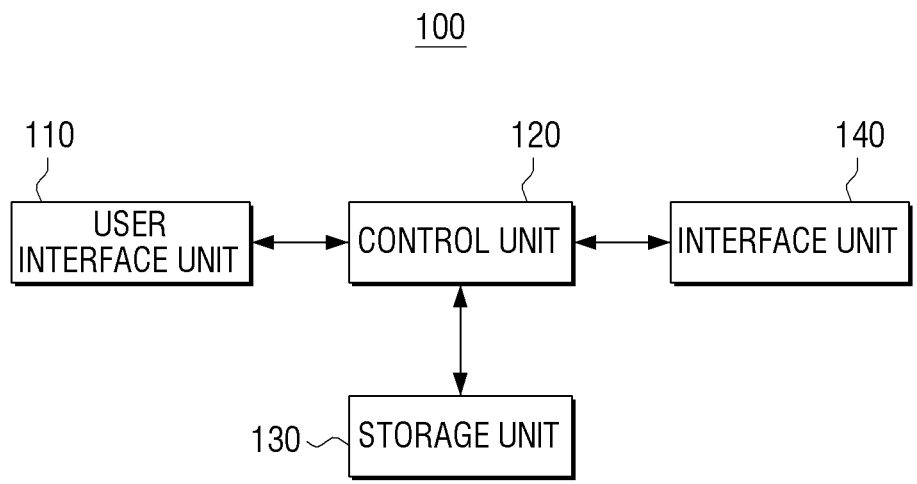
FIG. 2B is a block diagram which illustrates a detailed construction of a remote controller apparatus according to an exemplary embodiment.

FIG. 2B is a block diagram which illustrates a detailed construction of a remote controller apparatus according to an exemplary embodiment.

Referring to FIG. 2B, the remote controller apparatus 100 may include a user interface unit 110, a control unit 120, a storage unit 130, and an interface unit 140. In describing an exemplary embodiment with reference to FIG. 2B, the like elements with the same reference numerals as those of FIG. 2A will not be described in detail for the sake of brevity.

The interface unit 140 may transfer at least one control instruction received via the user interface unit 110 to the broadcast receiving apparatus 200, and receive status information relating to the broadcast receiving apparatus 200 based on at least one control instruction. As used herein, the "status information" may include at least one of: channel status, volume status, input source status, sound mode status, screen aspect ratio status, and screen brightness status of the broadcast receiving apparatus 200.

The status information may be encoded at the broadcast receiving apparatus 200 before being transmitted to the interface unit 140.

The interface unit 140 with the functions described above may include an infrared (IR) transmitting unit (not illustrated)

to transmit one of IR codes related to the broadcast receiving apparatus 200, i.e., to transmit at least one IR code that corresponds to the user's control instruction to the broadcast receiving apparatus 200, and an IR receiving unit (not illustrated) to receive status information transmitted from the broadcast receiving apparatus 200.

Alternatively, the interface unit 140 may transmit at least one control instruction by bi-directional wireless communication with the broadcast receiving apparatus 200, and receive status information relating to the broadcast receiving apparatus 200 based on the at least one control instruction. As used herein, a type of the "bi-directional wireless communication" may include, for example, BlueTooth (BT) communication, Radio Frequency (RF) communication, Wireless Fidelity (WI-FI) communication, High Definition Multimedia Interface—Consumer Electronics Control (HDMI-CEC) communication, or Wireless HDMI-CEC communication.

The control unit 120 may cause the status information to be stored by the storage unit 130, and upon receipt of an instruction relating to setting macro functionality, generate a macro instruction to control the broadcast receiving apparatus 200 based on the status information and then cause the generated macro instruction to be stored by the storage unit 130.

By way of example, channel status information indicating a channel status of the broadcast receiving apparatus 200 as "channel 11" may be received at the interface unit 140 and stored at the storage unit 130. Upon receipt of an instruction relating to setting macro functionality, the control unit 120 may map an IR code to change the channel of the broadcast receiving apparatus 200 to "channel 11" to a corresponding macro functionality.

In particular, the control unit 120 may use an IR code corresponding to number button 1 to set channel and an IR code corresponding to number button 1 to set channel, to thereby generate a macro instruction and cause the generated macro instruction to be stored by the storage unit 130, so that the channel of the broadcast receiving apparatus 200 changes to "channel 11" when the user subsequently executes the set macro functionality.

Further, the control unit 120 may update prestored status information based on the recently-received status information, and then cause the updated status information to be stored by the storage unit 130.

In particular, if the control instructions are transmitted sequentially to the broadcast receiving apparatus 200 via the interface unit 140 so that the status information of the broadcast receiving apparatus 200 is sequentially received as a response, the control unit 120 may control so that the most recently received status information overwrites the previously-received status information, and only the most recently received status information is stored by the storage unit 130.

The channel status information may overwrite the preceding channel status information so that only the most recently received channel status information is always stored by the storage unit 130, and the volume status information may overwrite the preceding volume status information so that only the most recently received volume status information is always stored by the storage unit 130. Accordingly, channel status information and volume status information may be managed separately.

Likewise, the input source status information, sound mode status information, screen aspect ratio status information and screen brightness status information may also overwrite the preceding corresponding information, respectively. Accordingly, only the most recently received input source status information, sound mode status information, screen aspect ratio status information and screen brightness status information may be stored by the storage unit 130 respectively.

In addition, the control unit 120 may control the interface unit 140 to transmit various control commands to the broadcast receiving apparatus 200. For example, the control unit 120 may control the interface unit 140 to transmit a control command corresponding to a macro instruction stored in the storage unit 130 to the broadcast receiving apparatus 200. Herein, the macro command may be a macro instruction which is generated based on a control command input during a predetermined time before a command to set a macro function is input or a macro instruction which is generated based on status information of the broadcast receiving apparatus 200.

For example, suppose a case where channel status information that the channel status of the broadcast receiving apparatus 200 is "channel 11" is received through the interface unit 140 and an IR code to change the channel of the broadcast receiving apparatus to "channel 11" is stored in the storage unit 130. In this case, if a user manipulation to execute the corresponding macro function is input through the user interface unit 110, the control unit 120 may control the interface unit 140 to transmit the IR code which is mapped with the corresponding macro function and stored in the storage unit 130, that is, the IR code to change the channel to "channel 11" to the broadcast receiving apparatus 200.

Further, the control unit 120 may control the user interface unit 110 to display a macro instruction corresponding to a preset condition, if a search instruction relating to the macro instructions stored by the storage unit 130 is received.

In particular, the user interface unit 110 may display a user interface window which enables a user to set day or time information at which the macro instruction is displayed, and the control unit 120 may control so that the corresponding macro instruction is displayed through the user interface unit 110 at a specific day or time, based on the day or time information received via the user interface window.

By way of example, if a user instruction sets that a specific macro instruction be displayed "every Wednesday" and "19:00~20:00", the control unit 120 may control so that the corresponding macro instruction is displayed on the user interface unit 110 only when the macro search instruction is received at a day and time that corresponds to "every Wednesday" and "19:00~20:00".

In another example, the control unit 120 may control the setting of macro functionality so that the time information at which the macro functionality is set is stored by the storage unit 130 in conjunction with the macro instruction.

In particular, without requiring a user's separate input relating to a time when the macro instruction is to be displayed, the control unit 120 may display the specific macro instruction at specific day or time based on the time information stored by the storage unit 130.

By way of example, if a macro instruction relating to controlling the broadcast receiving apparatus 200 to set a channel to "channel 11" and to set a volume to "volume 16" is generated at "19:50, Monday", the control unit 120 may cause the storage unit 130 to store the time information relating to "Monday" and "19:50" in conjunction with the respective IR codes corresponding to changing the channel and the volume of the broadcast receiving apparatus 200 to "channel 11" and "volume 16".

Accordingly, the control unit 120 may control so that, if a macro search instruction is received at a day and time that correspond to "every Monday" and "19:00~20:00", a macro instruction corresponding to "channel 11" and "volume 16" is displayed on the user interface unit 110.

Further, if an instruction relating to setting macro functionality is received, the control unit 120 may generate a macro instruction relating to controlling the broadcast receiving apparatus 200 by setting a status based on the status information, and automatically generate a macro title relating to the generated macro instruction based on a preset reference.

The control unit 120 may generate the macro title corresponding to the status information based on the Electronic Program Guide (EPG) information relating to the broadcast receiving apparatus 200. Accordingly, the interface unit 140 may receive the status information in conjunction with the EPG information from the broadcast receiving apparatus, and may also receive the EPG information from an external server (not illustrated).

The control unit 120 may generate the macro title corresponding to the channel status information relating to the broadcast receiving apparatus 200 based on the title of the program included in the EPG information.

By way of example, it is assumed that "channel 11" to indicate the current channel status and EPG information are received from the broadcast receiving apparatus 200.

In the above example, the control unit 120 may generate a macro instruction relating to changing the channel of the broadcast receiving apparatus 120 to "channel 11" based on the instruction relating to setting macro functionality. If the title of the program currently being broadcast on "channel 11" is "Star Wars", the control unit 120 may automatically generate "Star Wars" as the macro title based on the macro instruction relating to changing the channel to "channel 11".

Further, if one of the control instructions included in the macro instruction is transmitted to the broadcast receiving apparatus 200 and the broadcast receiving apparatus 200 performs an operation based on the transmitted control instruction, the control unit 120 may transmit the next control instruction included in the macro instruction.

The macro instruction may include, for example, a channel tune instruction, and/or a volume adjustment instruction. In particular, if an instruction relating to tuning a channel is transmitted to the broadcast receiving apparatus 200 via the interface unit 140, as a response, the channel status information is received from the broadcast receiving apparatus 200. If the channel status information is received via the interface unit 140, the control unit 120 may then transmit the instruction relating to adjusting a volume to the broadcast receiving apparatus 200. Accordingly, it is possible to sequentially transmit the control instructions included in the macro instruction to the broadcast receiving apparatus 200.

The channel tune instruction is first transmitted in the example described above for purpose of illustration. However, other examples are also possible. For example, a volume adjustment instruction may be sent first, and a channel tune instruction may be transmitted upon receiving volume status information from the broadcast receiving apparatus 200.

Further, the channel tune instruction and the volume adjustment instruction are included in the macro instruction as an illustrative example. However, other examples are also possible. For example, an instruction relating to changing an input source, an instruction relating to changing a sound mode, an instruction relating to changing a screen aspect ratio, and an instruction relating to changing a screen brightness, among other types of instructions, may also be included in the macro instruction.

By way of example, it is assumed that the macro instruction includes an instruction relating to changing an input source to "HDMI port" and an instruction relating to changing the screen aspect ratio to "wide (16:9)".

In the above example, as a corresponding macro instruction is selected, the instruction relating to changing an input source is transmitted to the broadcast receiving apparatus 200 via the interface unit 140, and as a response, the input source status information is received from the broadcast receiving apparatus 200. If the input source status information is received via the interface unit 140, the control unit 120 may transmit the instruction relating to changing the screen aspect ratio to the broadcast receiving apparatus 200.

The storage unit 130 may include a temporary storage area for temporarily storing status information received via the interface unit 140 and an automatic storage area for providing redundant storage of the status information stored at the temporary storage area.

Accordingly, if an instruction relating to setting macro functionality is not received within a preset standby time after the reception of the status information, the control unit 120 may cause the status information stored at the temporary storage area to be stored at the automatic storage area and initialize the temporary storage area.

Further, if the status information repeats at least a preset number of times in the status information stored at the automatic storage area, the control unit 120 may control the user interface unit 110 to display a recommendation screen to recommend the repeating status information as a macro functionality.

By way of example, it is assumed that status information sequence including "volume 16", "channel 11", "channel 10", "channel 11", "volume 15", "volume 16" is stored at the automatic storage area.

In the above example, because each of "channel 11" and "volume 16" repeats at least two times, the control unit 120 may display the user interface window on the user interface unit 110 to recommend "channel 11" and "volume 16" as macro functionality.

The "preset number of times" may be set by the user.

In the example described above, a user interface window used for providing a recommendation relating to macro functionality is displayed on the user interface unit 110 of the remote controller apparatus 100 as an illustrative example. However, other examples are possible. In particular, the remote controller apparatus 100 may send out a control instruction to the broadcast receiving apparatus 200 to display the user interface window in order to provide a recommendation relating to a macro functionality via a display unit of the broadcast receiving apparatus 200.

The macro instruction is generated to control the broadcast receiving apparatus 200 based on "channel 11" and "volume 16" as an illustrative example. However, other examples are also possible. Accordingly, one example includes setting a first macro instruction relating to controlling the broadcast receiving apparatus 200 based on "channel 11" and a second macro instruction relating to controlling the broadcast receiving apparatus 200 based on "volume 16" respectively.

Figure 3A:
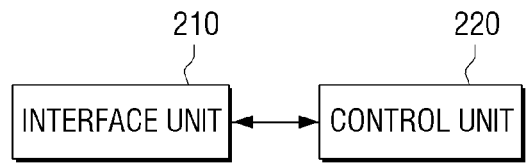
FIG. 3A is a block diagram which illustrates a construction of a broadcast receiving apparatus according to an exemplary embodiment.

FIG. 3A is a block diagram which illustrates a construction of a broadcast receiving apparatus according to an exemplary embodiment.

Referring to FIG. 3A, the broadcast receiving apparatus 200 may include an interface unit 210 and a control unit 220.

The interface unit 210 may receive a control instruction from the remote controller apparatus 100 and send out the status information relating to the broadcast receiving apparatus 200 to the remote controller apparatus 100. As used herein, the "status information" may include one or more of: channel status information, volume status information, input source status information, sound mode status information, screen aspect ratio status information, and screen brightness status information relating to the broadcast receiving apparatus 200.

The interface unit 210 with the functions described above may include an IR receiving unit (not illustrated) to receive an IR code corresponding to the control instruction transmitted from the remote controller apparatus 100, and an IR transmitting unit (not illustrated) to transmit status information to the remote controller apparatus 100.

Alternatively, the interface unit 210 may transmit at least one control instruction by bi-directional wireless communication with the remote controller apparatus 100, and receive status information relating to the broadcast receiving apparatus 200 based on the at least one control instruction. As used herein, the type of "bi-directional wireless communication" may include, for example, BlueTooth (BT) communication, Radio Frequency (RF) communication, Wireless Fidelity (WI-FI) communication, High Definition Multimedia Interface (HDMI-CEC) communication, or Wireless HDMI-CEC communication.

The control unit 220 may control the respective components of the broadcast receiving apparatus 200, and the control unit 220 may also control the overall operation of the broadcast receiving apparatus 200.

The control unit 220 may particularly control the status of the broadcast receiving apparatus based on the at least one control instruction. In particular, based on the at least one control instruction received from the remote controller apparatus 100, the control unit 220 may control so that the operations such as channel change, volume adjustment, input source change, sound mode change, screen aspect ratio change, and screen brightness change are performed.

Further, if a macro instruction is received from the remote controller apparatus 100, the control unit 220 may change the status of the broadcast receiving apparatus 200 based on a plurality of control instructions included in the macro instruction.

As used herein, the macro instruction may include at least one of: an instruction relating to changing a channel, an instruction relating to adjusting a volume, an instruction relating to changing an input source, an instruction relating to changing a sound mode, an instruction relating to changing a screen aspect ratio, and an instruction relating to changing a screen brightness.

Accordingly, based on the macro received from the remote controller apparatus, the control unit 220 may control the operations of the broadcast receiving apparatus including channel change, volume adjustment, input source change, sound mode change, screen aspect ratio change, or screen brightness change.

Further, the control unit 220 may encode the status information before transmitting the same to the remote controller apparatus 100.

In particular, the control unit 220 may encode the status information using the encoded key pre-defined with the remote controller apparatus 100 before sending the same to the remote controller apparatus 100. By way of example, encoding such as Rivest Shamir Adleman (RSA) encoding may be implemented.

By way of example, it is assumed that the broadcast receiving apparatus 200 receives a password "ABCD" from the remote controller apparatus 100, in order to log in to a specific website using the internet.

Accordingly, as the user receives "ABCD" as a password from the remote controller apparatus 100 and sends the same to the broadcast receiving apparatus 200, the control unit 220 generates an encoded value (e.g., RFCV) based on the received password "ABCD". Then, the control unit 220 controls the interface unit 210 to transfer the encoded value "RFCV" to the remote controller apparatus 100 as the status information relating to the broadcast receiving apparatus 200.

Next, the remote controller apparatus 100 may store the encoded value "RFCV" or decrypt the encoded value using the same encoded key as that used by the broadcast receiving apparatus and store "ABCD". Then, as an instruction relating to setting macro functionality is received from the user, the remote controller apparatus 100 may map the IR code corresponding to "ABCD" to the corresponding macro functionality and cause the same to be stored by the storage unit.

In one exemplary embodiment, the macro title may be set as "password RFCV input" or "password input". Accordingly, an information leak to a third party is prevented, because even when the third party executes an instruction relating to searching a macro via the remote controller apparatus 100, only "password RFCV input" or "password input" appears on the user interface window.

Figure 3B:
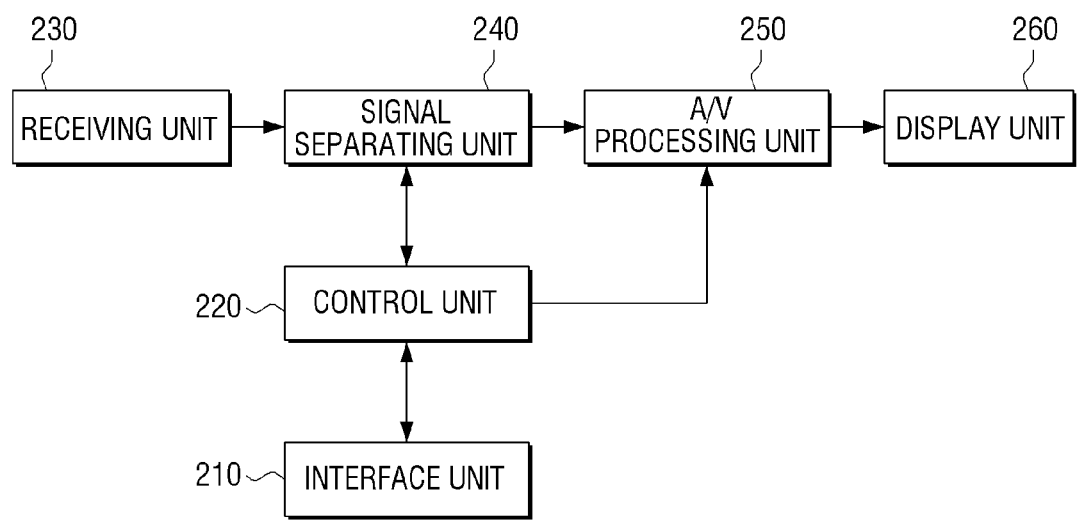
FIG. 3B is a block diagram which illustrates a detailed construction of a broadcast receiving apparatus according to an exemplary embodiment.

FIG. 3B is a block diagram which illustrates a detailed construction of a broadcast receiving apparatus according to an exemplary embodiment.

Referring to FIG. 3B, the broadcast receiving apparatus 200 may include an interface unit 210, a control unit 220, a receiving unit 230, a signal separating unit 240, an audio/video (A/V) processing unit 250, and a display unit 260. In the following description of the exemplary embodiment with reference to FIG. 3B, the like elements with the same reference numerals as those of FIG. 3A will not be described in detail for the sake of brevity.

The receiving unit 230 receives a broadcast from a broadcasting station or satellite by wired or wireless communication. In particular, the receiving unit 230 may be implemented as at least one tuner. Depending on system specifications, the receiving unit 230 may include a plurality of tuners in order to concurrently receive broadcast signals from a plurality of channels.

The signal separating unit 240 separates the broadcast signal into a video signal, an audio signal, and a broadcast information signal. The signal separating unit 240 then transmits the video and audio signals to the A/V processing unit 250, and transmits the broadcast information signal to the interface unit 210 and the control unit 220.

The A/V processing unit 250 performs signal processing with respect to the audio and video signals received from the signal separating unit 240, such as, for example, video decoding, video scaling, and/or audio decoding. Further, the A/V processing unit 250 outputs the video signal to the display unit 260 and outputs the audio signal to the audio output unit (not illustrated).

The display unit 260 displays the video signal received from the A/V processing unit 250 on the display, or outputs the video signal to an external apparatus (e.g., an external display) connected via an external output terminal.

The audio output unit (not illustrated) outputs audio included in the audio signal received from the A/V processing unit 250 through a speaker, or outputs the audio signal to an external apparatus (e.g., an external speaker) connected via external output terminal.

Further, the broadcast receiving apparatus 200 may additionally include a connecting unit (not illustrated) to connect the broadcast receiving apparatus 200 to a communication network such as, for example, the Internet, or to an external server, or a graphical user interface (GUI) generating unit (not illustrated) to generate a GUI to be displayed on the screen, and then to add the generated GUI to the video signal outputted from the A/V processing unit 250.

FIGS. 4A to 4D are views illustrating examples of receiving status information from a broadcast receiving apparatus according to an exemplary embodiment.

Figure 4A:
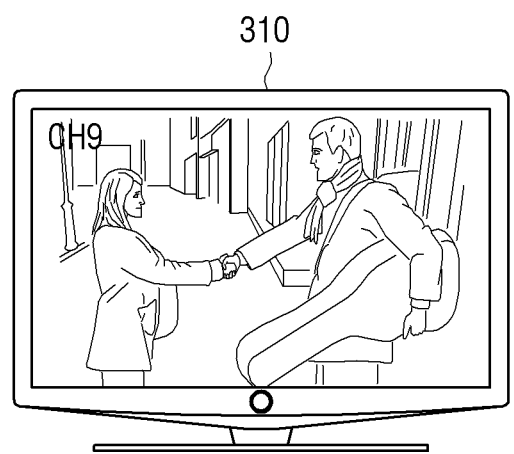
FIGS. 4A to 4D are views illustrating examples of receiving status information from a broadcast receiving apparatus according to an exemplary embodiment.
Figure 4A:
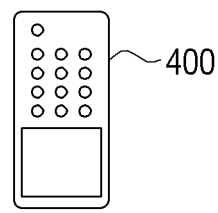

Referring to FIG. 4A, it is assumed that "channel 9" is currently displayed on the broadcast receiving apparatus 310.

Figure 4B:
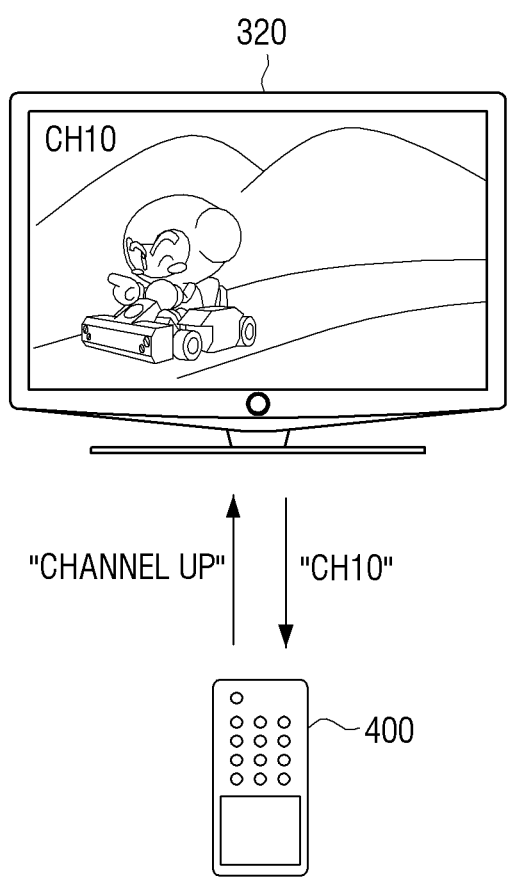

Referring to FIG. 4B, if "channel up" is transferred to the broadcast receiving apparatus 320 via the remote controller apparatus 400, the channel of the broadcast receiving apparatus 320 changes to "channel 10". Accordingly, the broadcast receiving apparatus 320 transmits the status information, i.e., current channel status as "channel 10", to the remote controller apparatus 400, and the remote controller apparatus 400 stores the corresponding channel status information.

Figure 4C:
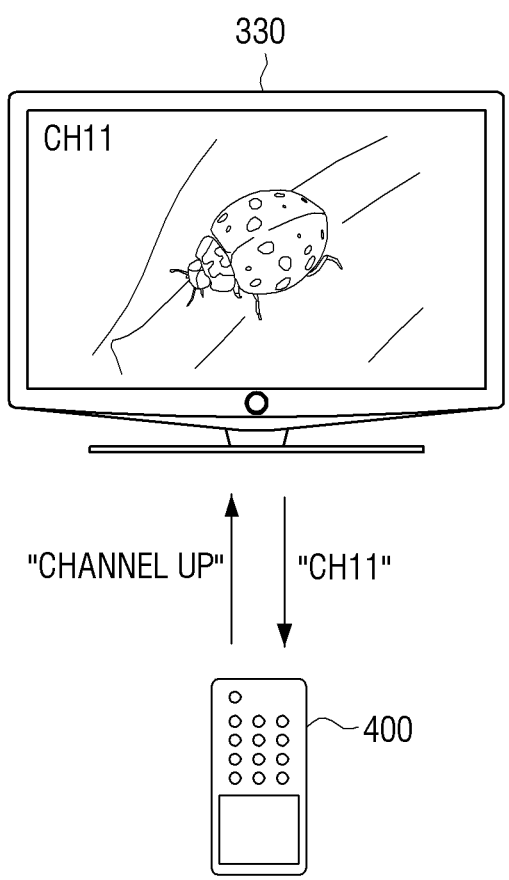

Referring to FIG. 4C, if "channel up" is transmitted to the broadcast receiving apparatus 330 via the remote controller apparatus 400, the channel of the broadcast receiving apparatus 330 changes to "channel 11". Accordingly, the broadcast receiving apparatus 330 transmits the status information, i.e., current channel status as "channel 11", to the remote controller apparatus 400, and the remote controller apparatus 400 stores the corresponding channel status information.

The remote controller apparatus 400 may update the prestored channel information with the recently received channel information and store the result. In particular, the remote controller apparatus 400 may overwrite "channel 10", the previously-stored channel status information relating to the broadcast receiving apparatus, with "channel 11" and store the result.

Figure 4D:
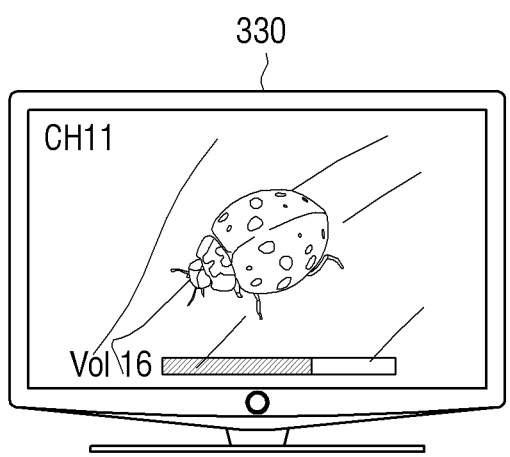
Figure 4D:
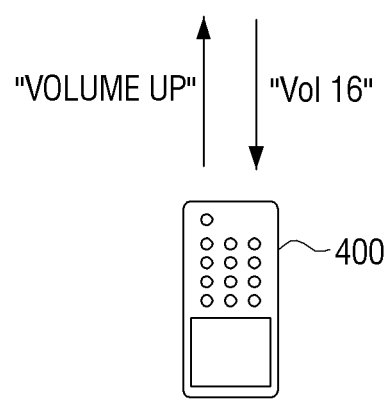

Referring to FIG. 4D, if "volume up" is transmitted to the broadcast receiving apparatus 330 via the remote controller apparatus 400, the volume of the broadcast receiving apparatus 330 changes to "volume 16". Accordingly, the broadcast receiving apparatus 330 transmits the status information, i.e., current volume status as "volume 16", to the remote controller apparatus 400, and the remote controller apparatus 400 stores the corresponding volume status information.

As a result, the remote controller apparatus 400 stores the current channel and volume status information of the broadcast receiving apparatus as "channel 11" and "volume 16".

FIGS. 5A to 5G are views illustrating a method for setting macro functionality based on the status information stored in advance, according to an exemplary embodiment.

Figure 5A:
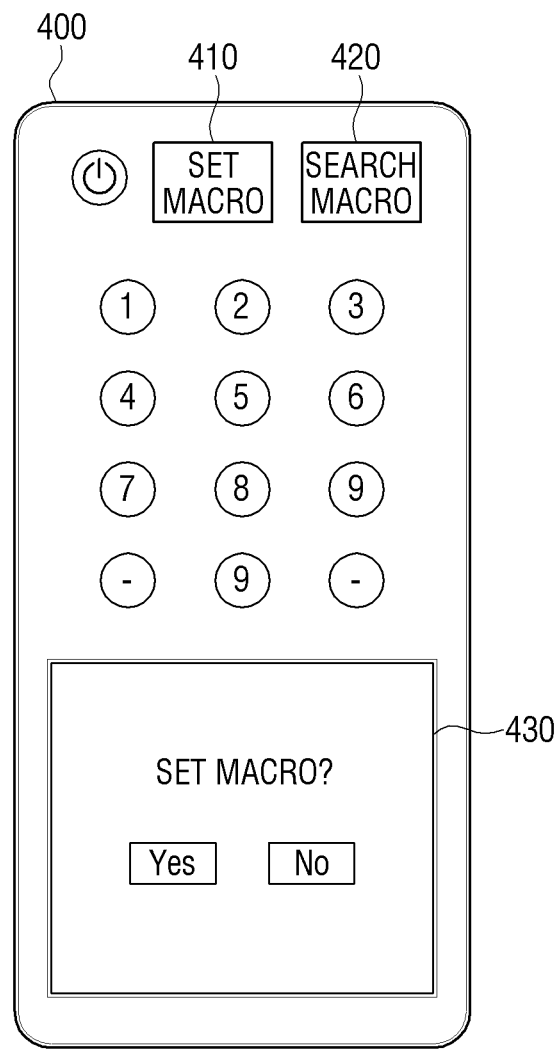
FIGS. 5A to 5G are views illustrating a method for setting macro functionality based on the status information stored in advance, according to an exemplary embodiment.

Referring to FIG. 5A, if a specific button (e.g., set macro key 410) provided on the remote controller apparatus 400 is activated, a user interface window 430, including a message relating to confirming a setting of a macro, appears on the user interface unit of the remote controller apparatus 400.

Figure 5B:
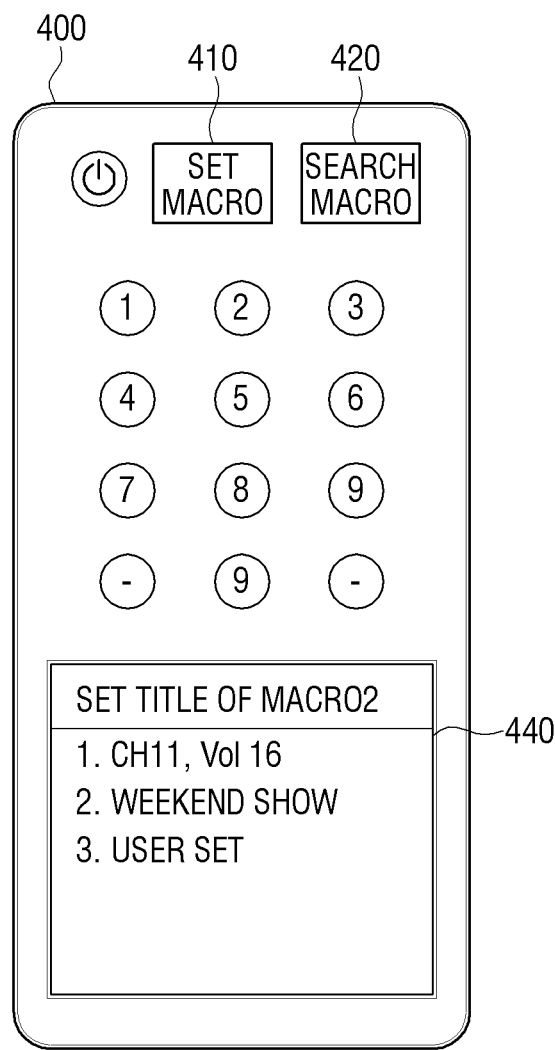
Figure 5C:
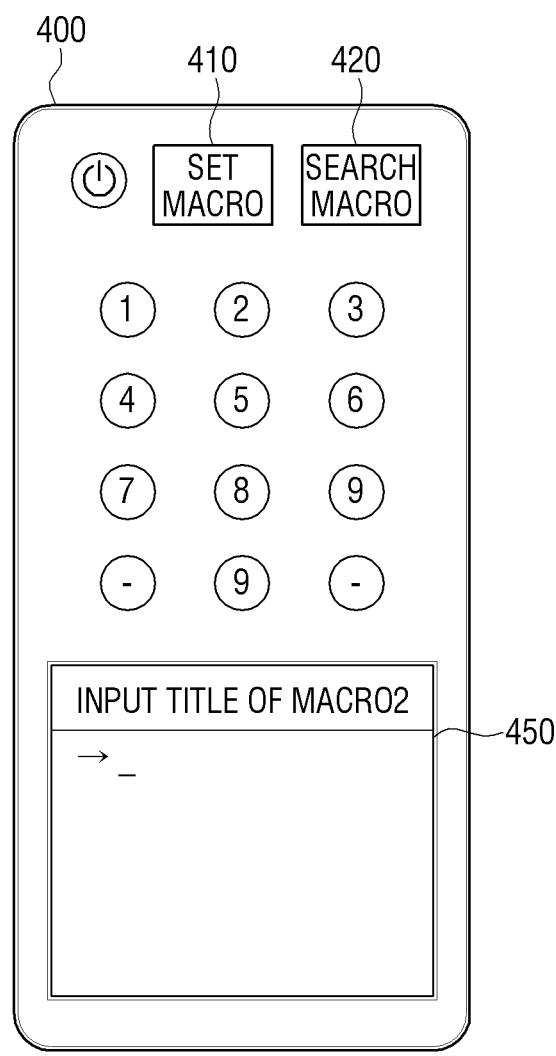

If the user chooses "Yes", referring to FIG. 5B, the user interface window 440 relating to setting a macro title appears on the user interface unit. The macro title may include, for example, prestored status information (e.g., 1. CH. 11, Vol. 16), or a program title (e.g., 2. weekend show). Alternatively, the user may directly input a macro title via the user interface window 450 (referring also to FIG. 5C) by selecting "3. User set" displayed on the user interface window 440. For example, if "User set" is selected the remote controller apparatus 100 may receive a macro title through a key pad formed on the remote controller apparatus 100, and the control unit 120 may receive a user manipulation to set a macro title by displaying a virtual keyboard through the user interface unit 110.

As described above, the user may set the macro title by selecting one of "1. CH 11, Vol 16", "2. Weekend Show", "3. User set".

Figure 5D:
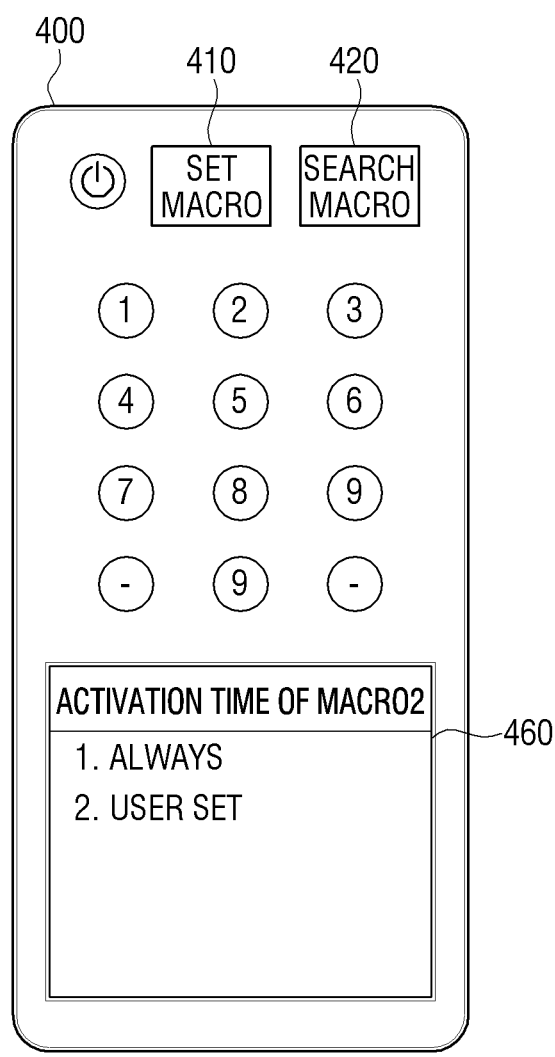

If the macro title is completely set, referring to FIG. 5D, the user interface window 460 relating to setting a macro activation time may appear. As used herein, the "macro activation time" may indicate a specific day or time at which the stored macro instruction is displayed.

The user may set the macro activation time by selecting one of "1. Always", or "2. User set" on the user interface window 460. As used herein, "1. Always" may indicate that the macro instruction is activated upon receipt of the control instruction relating to powering on the broadcast receiving apparatus.

Figure 5E:
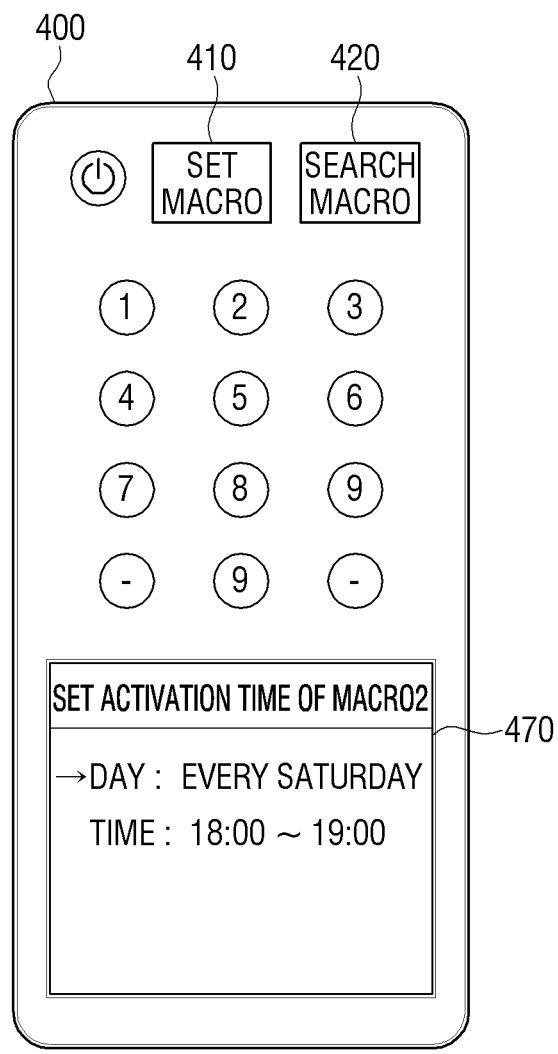

If "2. User set" is selected, referring to FIG. 5E, the user interface window 470 relating to setting the macro activation time may appear. Referring to FIG. 5E, the user may set the specific day and time to activate the macro instruction at "every Saturday" and "18:00~19:00". However, the above is provided only as an illustrative example, and the macro activation time may be set at any one of various time scales. Meanwhile, the remote controller apparatus 100 may receive a macro activation time through a keyboard formed on the remote controller apparatus 100, and the control unit 120 may receive a user manipulation to set a macro activation time by displaying a virtual keyboard through the user interface unit 110.

Figure 5F:
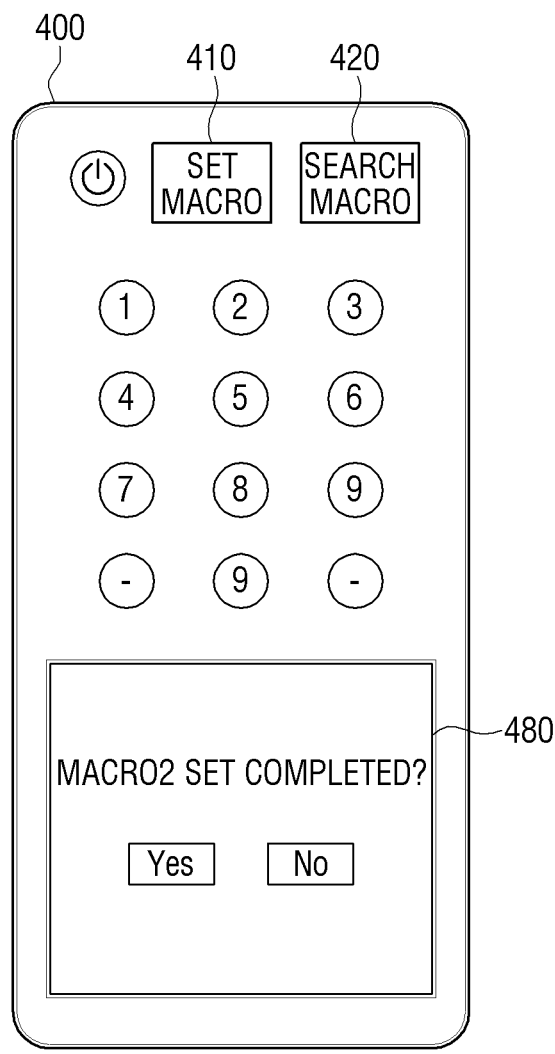

If setting the macro activation time is completed, referring to FIG. 5F, the user interface window 480 relating to inquiring as to whether a setting of the macro is completed or not. If the user selects "Yes", setting of the macro functionality is completed.

If the setting of the macro functionality is completed, the user may activate a predetermined button (e.g., search macro key 420) provided on the remote controller apparatus 400 to confirm a prestored macro instruction relating to the remote controller apparatus 400.

In the examples described above with respect to FIGS. 5A to 5F, it is assumed that the user sets "Weekend show" as the macro title to thus generate macro instruction 2, and that macro instruction 1 is prestored before macro instruction 2 is generated.

Figure 5G:
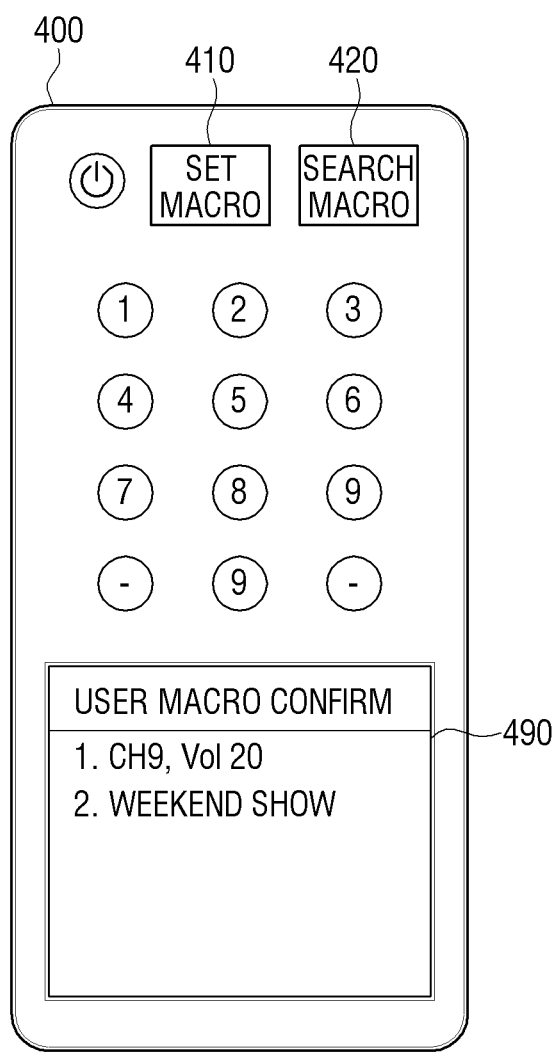

Accordingly, referring to FIG. 5G, "1. CH 9, Vol 20" and "2. Weekend Show" are stored at the remote controller apparatus as the macro instructions and displayed as user interface window 490. It is also assumed that the title of the macro instruction "1. CH 9, Vol 20" is determined based on the status information, and the title of the macro instruction "2. Weekend Show" is determined based on the title of the program.

Figure 6A:
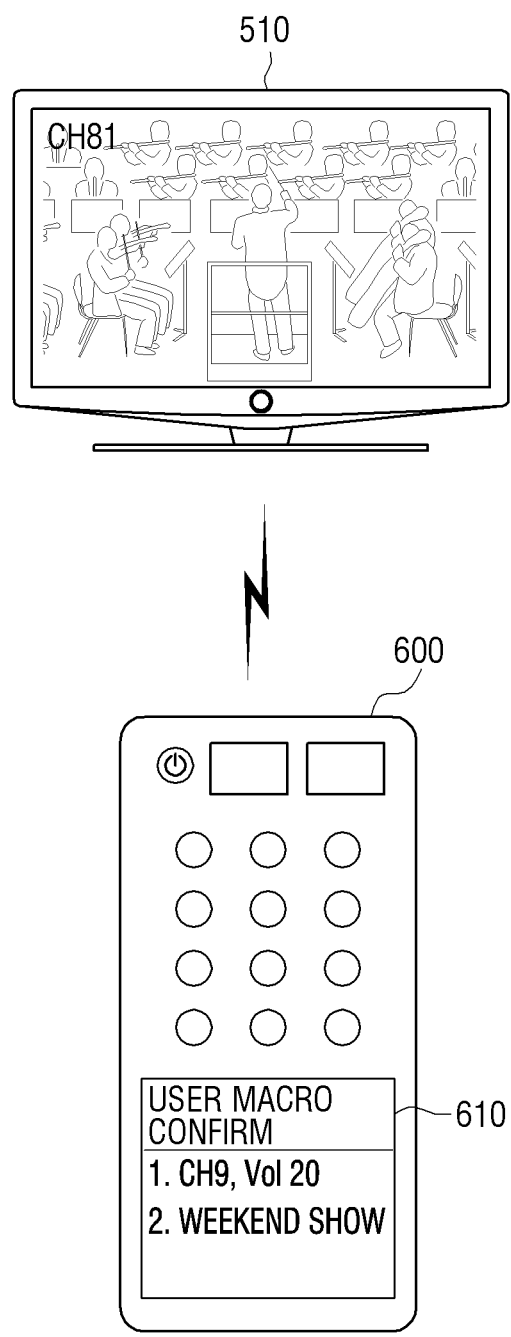
FIGS. 6A and 6B are views which illustrate a method for controlling a broadcast receiving apparatus based on macro instructions stored according to an exemplary embodiment.
Figure 6B:
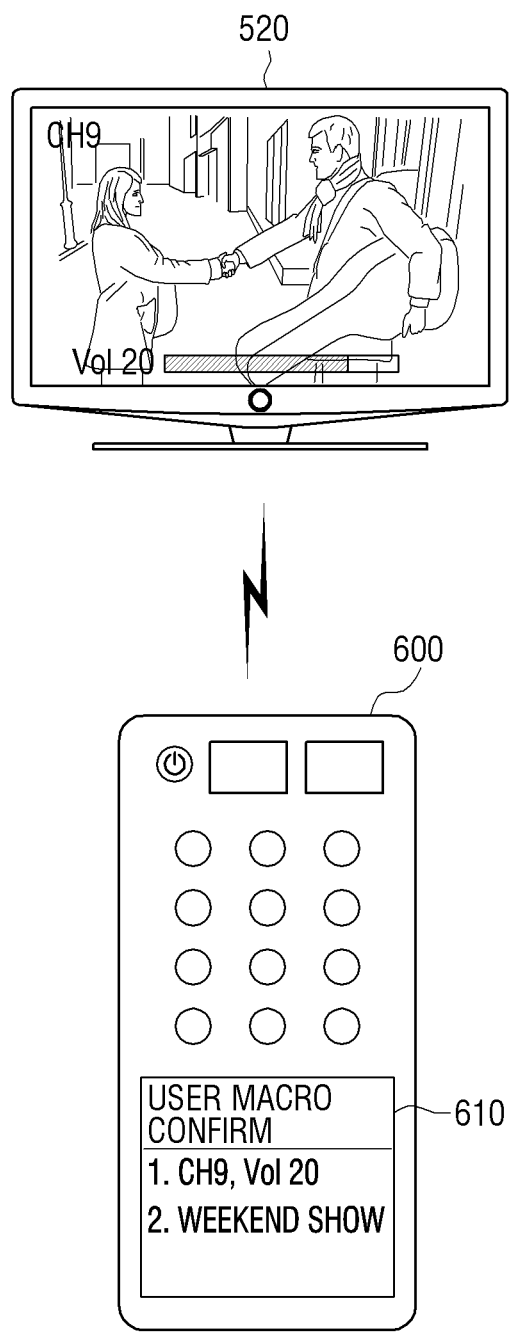

FIGS. 6A and 6B are views which illustrate a method for controlling a broadcast receiving apparatus by using stored macro instructions, according to an exemplary embodiment.

If the user activates a predetermined button (e.g., macro search key) provided on the remote controller apparatus 400, prestored macro instructions included in the remote controller apparatus 400 are displayed on the user interface unit.

By way of example, referring to FIG. 6A, based on the macro search instruction received from the user, prestored macro instructions, i.e., "1. CH 9, Vol 20", "2. Weekend Show" are displayed on the user interface window 610.

Then, if the user selects "1. CH 9, Vol 20", the remote controller apparatus may transmit a control instruction to control the channel and volume status of the broadcast receiving apparatus 510 to "CH 9, Vol 20". Accordingly, referring to FIG. 6A, the channel of the broadcast receiving apparatus 510 changes to "Ch 9" and the volume changes to "vol 20".

The control instruction relating to controlling the channel and volume status of the broadcast receiving apparatus received from the remote controller apparatus will be described below with reference to FIG. 6B.

First, in order to change the channel status to "CH 9", an IR code corresponding to number button 9 to set channel may be transmitted.

Further, in order to change the volume status to "Vol 20", the remote controller apparatus transmits either a "volume up" or a "volume down" instruction to the broadcast receiving apparatus 520. As a response, the remote controller apparatus 610 receives the volume status information relating to the broadcast receiving apparatus 520.

By way of example, if the volume status information received from the broadcast receiving apparatus 520 is "Vol 17", the remote controller apparatus 610 sequentially sends out a "volume up" instruction three times, to thus change the volume status of the broadcast receiving apparatus to "Vol 20".

FIG. 7 is a flowchart which illustrates a method for remote controlling a broadcast receiving apparatus according to an exemplary embodiment.

A control method used by a remote controller apparatus for controlling a broadcast receiving apparatus will be described below with reference to FIG. 7.

First, at operation S710, at least one control instruction relating to controlling the broadcast receiving apparatus is inputted and received in sequence.

At operation S720, an inquiry is made in order to confirm whether the instruction relating to setting the macro functionality has been inputted or not.

If it is confirmed that the instruction relating to setting the macro functionality has been inputted, then at operation S730, a macro instruction is generated based on the control instructions which have been received until the receipt of the instruction relating to setting the macro functionality.

At operation S740, the macro instruction generated at operation S730 is stored.

It is possible to transmit at least one control instruction to the broadcast receiving apparatus and receive the status information of the broadcast receiving apparatus based on at least one control instruction. Accordingly, at operation S730, relating to generating a macro instruction, the status information is stored, and upon receipt of an instruction relating to setting macro functionality, a macro instruction may be generated to control the broadcast receiving apparatus based on the stored status information.

As used herein, the "status information" may include at least one of: channel status and volume status of the broadcast receiving apparatus.

Further, it is possible to update the prestored status information based on the recently received status information, and then store the updated status information.

If an instruction relating to searching the stored macro instruction is received, it is possible to display the stored macro instruction that corresponds to the preset conditions.

Further, at operation S730 relating to generating the macro instruction, if an instruction relating to setting macro functionality is received, it is possible to generate a macro instruction relating to controlling the broadcast receiving apparatus based on the status information, and then to automatically generate the macro title for the generated macro instruction based on preset conditions.

In the above example, at operation S730 relating to generating the macro instruction, it is possible to generate the macro title corresponding to the status information based on the EPG information relating to the broadcast receiving apparatus.

The macro instruction herein may include at least one of: a channel tune instruction and a volume adjustment instruction. If one of the control instructions included in the macro instruction is transmitted to the broadcast receiving apparatus and the broadcast receiving apparatus performs the operation based on the received control instruction, the next control instructions included in the macro instruction can also be transmitted.

The status information described herein may include encoded information.

Further, the remote controller apparatus may include a storage unit having a temporary storage area for temporarily storing the received status information, and an automatic storage area for providing redundant storage of the stored status information. Accordingly, the remote controller apparatus may automatically cause the stored status information being stored at the temporary storage area to be stored at the automatic storage area and initialize the temporary storage area, if an instruction relating to setting macro functionality is not received during a preset standby time after the reception of the status information.

Further, among the status information stored at the automatic storage area, if there is status information that repeats at least a predetermined number of times, a recommend screen may appear to recommend that the repeating status information be set as the macro functionality.

Further, at operation S730 relating to generating a macro instruction, it is possible to combine control instructions that are received within a preset amount of time until the time at which the instruction relating to setting macro functionality is received, to thereby generate the macro instruction.

Further, the remote controller apparatus may include a storage unit which includes a temporary storage area for temporarily storing the received at least one control instruction, and an automatic storage area for providing redundant storage of the stored at least one control instruction being stored at the temporary storage area. Accordingly, at operation S730 relating to generating a macro instruction, if an instruction relating to setting macro functionality is received within a preset standby time after elapse of the preset amount of time, the one or more control instructions that are received within the preset amount of time may be combined to thereby generate the macro instruction, and, if an instruction relating to setting macro functionality is not received within a preset standby time after elapse of the preset amount of time, the at least one control instruction stored at the temporary storage area may be stored at the automatic storage area and the temporary storage area may be initialized.

Further, if the control instruction patterns stored at the automatic storage area include at least one repeating control instruction pattern which repeats at least for a preset number of times, a recommend screen may appear to recommend that the repeating control instruction pattern be set as macro functionality.

FIG. 8 is a flowchart which illustrates a control method used by a broadcast receiving apparatus according to an exemplary embodiment.

Referring to FIG. 8, in one exemplary embodiment, at operation S810, a control instruction is received from the remote controller apparatus, and status information relating to the broadcast receiving apparatus which is controlled based on the control instruction is transmitted to the remote controller apparatus.

At operation S820, if a macro instruction is received from the remote controller apparatus, the status of the broadcast receiving apparatus may change based on a plurality of control instructions included in the macro instruction.

The status information herein may include at least one of: channel status information and volume status information relating to the broadcast receiving apparatus.

In an exemplary embodiment, a program to execute a control method for controlling the remote controller apparatus and the broadcast receiving apparatus may be recorded on a storage medium, i.e., on computer-readable recording medium. As used herein, the computer-readable recording medium may include any or all kinds of recording devices that store data to be read out by a computer system. Examples of the computer-readable recording medium include: read-only memory (ROM), random access memory (RAM), compact disk-read-only memory (CD-ROM), magnetic tape, floppy disk, optical data storage device, or the like, and the computer-readable recording medium may be distributed over a computer system connected via network to store and execute codes to be read out by the computer in a distributive manner.

The foregoing exemplary embodiments and advantages are merely exemplary and are not to be construed as limiting the present inventive concept. The present disclosure can be readily applied to other types of apparatuses. Also, the description of the exemplary embodiments of the present inventive concept is intended to be illustrative, and not to limit the scope of the claims, and many alternatives, modifications, and variations will be apparent to those skilled in the art.

What is claimed is:

1. A remote controller apparatus for controlling a broadcast receiving apparatus, the remote controller apparatus comprising:
   a storage unit;
   a user interface unit which receives at least one control instruction relating to controlling the broadcast receiving apparatus;
   an interface unit which transmits the at least one control instruction received via the user interface unit to the broadcast receiving apparatus, and which receives status information relating to the broadcast receiving apparatus from the broadcast receiving apparatus; and
   a control unit which causes the status information to be stored by the storage unit, and if the instruction received via the user interface unit is a macro instruction,
   generates a plurality of instruction signals based on the status information stored in the storage unit and setting information associated with the macro instruction, and
   causes the generated plurality of instruction signals to be transmitted to the broadcast receiving apparatus.

2. The remote controller apparatus of claim 1, wherein the status information comprises at least one of: channel status, volume status, input source status, sound mode status, screen aspect ratio status and screen brightness status of the broadcast receiving apparatus.

3. The remote controller apparatus of claim 1, wherein the control unit uses recently-received status information to update prestored status information, and causes the updated status information to be stored by the storage unit.

4. The remote controller apparatus of claim 1, wherein, if an instruction relating to searching the macro instructions stored by the storage unit is received, the control unit controls the user interface unit to cause the stored macro instruction that satisfies a preset condition included in the instruction relating to searching the macro instructions to be displayed.

5. The remote controller apparatus of claim 1, wherein, if the instruction received is the macro instruction, the control unit generates the plurality of instruction signals based on a status that corresponds to the status information, and automatically generates a macro title for the generated plurality of instruction signals based on a preset condition.

6. The remote controller apparatus of claim 5, wherein the control unit generates a macro title corresponding to the status information based on Electronic Program Guide (EPG) information relating to the broadcast receiving apparatus.

7. The remote controller apparatus of claim 1, wherein the macro instruction comprises at least one of: an instruction relating to tuning a channel and an instruction relating to adjusting a volume, and the control unit transmits one of the at least one control instruction included in the macro instruction to the broadcast receiving apparatus and, if the broadcast receiving apparatus performs an operation based on the transmitted at least one control instruction, transmits a next control instruction included in the macro instruction to the broadcast receiving apparatus.

8. The remote controller apparatus of claim 1, wherein the status information includes encoded information.

9. The remote controller apparatus of claim 1, wherein the storage unit comprises a temporary storage area for temporarily storing the status information received via the interface unit, and an automatic storage area for providing redundant storage of the status information stored at the temporary storage area, and if an instruction relating to setting macro functionality is not received within a preset standby time after reception of the status information, the control unit causes the status information stored at the temporary storage area to be stored at the automatic storage area and initializes the temporary storage area.

10. The remote controller apparatus of claim 9, wherein, if there is status information stored at the automatic storage area that repeats at least a predetermined number of times, the control unit controls the user interface unit to display a recommend screen to recommend that the repeating status information be set to macro functionality.

11. A broadcast receiving apparatus, comprising:
    an interface unit which receives a control instruction from a remote controller apparatus and which transmits status information relating to the broadcast receiving apparatus to the remote controller apparatus; and
    a control unit which controls a status of the broadcast receiving apparatus based on the control instruction, wherein if a macro instruction is received from the remote controller apparatus, the control unit receives a plurality of instruction signals based on the status information and setting information associated with the macro instruction.

12. The broadcast receiving apparatus of claim 11, wherein the status information comprises at least one of: channel status, volume status, input source status, sound mode status, screen aspect ratio status and screen brightness status of the broadcast receiving apparatus.

13. A control method for controlling a broadcast receiving apparatus by using a remote controller apparatus, the control method comprising:
    receiving at least one control instruction relating to controlling the broadcast receiving apparatus;
    transmitting the at least one control instruction to the broadcast receiving apparatus, and receiving status information relating to the broadcast receiving apparatus from the broadcast receiving apparatus;
    storing the status information, and if the instruction received is a macro instruction;
    generating a plurality of instruction signals based on the status information stored and setting information associated with the macro instruction; and
    causing the generated plurality of instructions signals to be transmitted to the broadcast receiving apparatus.

14. The control method of claim 13, wherein the status information comprises at least one of: channel status, volume status, input source status, sound mode status, screen aspect ratio status and screen brightness status of the broadcast receiving apparatus.

15. The control method of claim 13, further comprising using recently received status information to update prestored status information, and storing the updated status information.

16. The control method of claim 13, wherein, if an instruction relating to searching the stored macro instructions is received, the method further comprises displaying the stored macro instruction that satisfies a preset condition included in the instruction relating to searching the stored macro instructions.

17. The control method of claim 13, wherein the generating the plurality of instruction signals comprises, if the instruction received is the macro instruction, generating the plurality of instruction signals based on a status that corresponds to the status information, and automatically generating a macro title for the generated plurality of instruction signals according to a preset condition.

18. The control method of claim 17, wherein the generating the macro instruction comprises generating a macro title corresponding to the status information based on Electronic Program Guide (EPG) information relating to the broadcast receiving apparatus.

19. The control method of claim 13, wherein the macro instruction comprises at least one of: an instruction relating to tuning a channel and an instruction relating to adjusting a volume, and the control method further comprises transmitting one of the at least one control instruction included in the macro instruction to the broadcast receiving apparatus, and, if the broadcast receiving apparatus performs an operation based on the transmitted at least one control instruction, transmitting a next control instruction included in the macro instruction to the broadcast receiving apparatus.

20. The control method of claim 13, wherein the status information includes encoded information.

21. The control method of claim 13, wherein the storage unit comprises a temporary storage area for temporarily storing the status information received via the interface unit, and an automatic storage area for providing redundant storage of the status information stored at the temporary storage area, and the control method further comprises, if an instruction relating to setting macro functionality is not received within a preset standby time after reception of the status information, causing the status information stored at the temporary storage area to be stored at the automatic storage area and initializing the temporary storage area.

22. The control method of claim 20, further comprising, if there is status information stored at the automatic storage area that repeats at least a predetermined number of times, displaying a recommend screen to recommend that the repeating status information be set to macro functionality.

23. A control method for controlling a broadcast receiving apparatus, the control method comprising:
receiving a control instruction from a remote controller apparatus and transmitting status information relating to the broadcast receiving apparatus to the remote controller apparatus; and
if a macro instruction is received from the remote controller apparatus,
receiving a plurality of instruction signals based on the status information and setting information associated with the macro instruction.

24. The control method of claim 23, wherein the status information comprises at least one of: channel status, volume status, input source status, sound mode status, screen aspect ratio status and screen brightness status of the broadcast receiving apparatus.

* * * * *